US012756073B2

(12) United States Patent
Quan et al.

(10) Patent No.: US 12,756,073 B2
(45) Date of Patent: Oct. 6, 2026

(54) BUSBAR ASSEMBLIES FOR JOINING BATTERY CELLS OF TRACTION BATTERY PACKS

(71) Applicant: FORD GLOBAL TECHNOLOGIES, LLC, Dearborn, MI (US)

(72) Inventors: Guangchun Quan, Ann Arbor, MI (US); Yuyuan Wang, Windsor (CA); Paul John Bojanowski, Macomb Township, MI (US); Brian Utley, Canton, MI (US); Michael Orr, Ferndale, MI (US); Yinong Shen, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 709 days.

(21) Appl. No.: 18/184,131

(22) Filed: Mar. 15, 2023

(65) Prior Publication Data

US 2024/0313361 A1 Sep. 19, 2024

(51) Int. Cl.

*H01M 50/503* (2021.01)
*H01M 50/505* (2021.01)
*H01M 50/514* (2021.01)
*H01M 50/516* (2021.01)
*H01M 50/548* (2021.01)

(52) U.S. Cl.

CPC ....... *H01M 50/503* (2021.01); *H01M 50/505* (2021.01); *H01M 50/514* (2021.01); *H01M 50/516* (2021.01); *H01M 50/548* (2021.01); *H01M 2220/20* (2013.01)

(58) Field of Classification Search

CPC ............. H01M 50/503; H01M 50/548; H01M 50/516; H01M 50/505; H01M 50/514; H01M 2220/20

See application file for complete search history.

(56) References Cited

U.S. PATENT DOCUMENTS

| | | | | |
|---|---|---|---|---|
| 8,409,744 | B2 | 4/2013 | Ijaz et al. | |
| 8,486,557 | B2 | 7/2013 | Lee et al. | |
| 10,249,857 | B2 | 4/2019 | Lorentz et al. | |
| 10,680,226 | B2 | 6/2020 | Dawley | |
| 11,024,871 | B2 | 6/2021 | Lim et al. | |
| 11,088,410 | B2 * | 8/2021 | Ju | H01M 50/512 |
| 11,139,539 | B2 | 10/2021 | Kim et al. | |
| 2022/0376360 | A1 | 11/2022 | Cai et al. | |

FOREIGN PATENT DOCUMENTS

| | | | |
|---|---|---|---|
| DE | 102018106049 | A1 | 9/2018 |
| JP | 2007109548 | A | 4/2007 |

* cited by examiner

*Primary Examiner* — Jane J Rhee
(74) *Attorney, Agent, or Firm* — David B. Kelley; Carlson, Gaskey & Olds, P.C.

(57) ABSTRACT

Busbars are provided for electrically connecting battery cells within a traction battery pack. An exemplary busbar may include features for locating and positioning a tab terminal of a battery cell. For example, the busbar may include a slot and a bent portion. The tab terminal may be received within the slot such that at least a portion of the tab terminal is positioned on an opposite side of the busbar from a housing of the battery cell. The tab terminal may be secured (e.g., welded) to the bent portion at a section of the busbar that is exposed within the slot.

10 Claims, 6 Drawing Sheets

BUSBAR ASSEMBLIES FOR JOINING BATTERY CELLS OF TRACTION BATTERY PACKS

TECHNICAL FIELD

This disclosure relates generally to electrified vehicle traction battery packs, and more particularly to busbar assemblies for electrically connecting battery cells of traction battery packs.

BACKGROUND

A high voltage traction battery pack typically powers the electric machines and other electrical loads of an electrified vehicle. The traction battery pack includes a plurality of battery cells. The battery cells must be reliably connected to one another in order to provide the voltage and power levels necessary for achieving vehicle propulsion.

SUMMARY

A traction battery pack according to an exemplary aspect of the present disclosure includes, among other things, a busbar including a slot, and a battery cell including a housing and a tab terminal extending from the housing. The tab terminal is received within the slot such that at least a portion of the tab terminal is positioned on an opposite side of the busbar from the housing.

In a further non-limiting embodiment of the foregoing traction battery pack, the tab terminal is positioned against an upper surface of a bent portion of the busbar.

In a further non-limiting embodiment of either of the foregoing traction battery packs, the bent portion establishes a base of the slot.

In a further non-limiting embodiment of any of the foregoing traction battery packs, the bent portion extends in a direction away from the housing of the battery cell.

In a further non-limiting embodiment of any of the foregoing traction battery packs, the bent portion extends in a direction toward the housing of the battery cell.

In a further non-limiting embodiment of any of the foregoing traction battery packs, a weld secures the tab terminal to the bent portion.

In a further non-limiting embodiment of any of the foregoing traction battery packs, the slot is flanked by a first crimped portion and a second crimped portion of the busbar.

In a further non-limiting embodiment of any of the foregoing traction battery packs, each of the first crimped portion and the second crimped portion includes an inner curved surface that is configured to limit an insertion distance of the tab terminal into the slot.

In a further non-limiting embodiment of any of the foregoing traction battery packs, the tab terminal is received within a groove of each of the first crimped portion and the second crimped portion.

In a further non-limiting embodiment of any of the foregoing traction battery packs, an elastic guide is configured to urge the tab terminal into the slot.

In a further non-limiting embodiment of any of the foregoing traction battery packs, the elastic guide includes a flexible clip-like feature.

In a further non-limiting embodiment of any of the foregoing traction battery packs, the elastic guide is part of a busbar frame that is secured to the busbar. The busbar frame and the busbar establish a bus bar module of the traction battery pack.

A traction battery pack according to another exemplary aspect of the present disclosure includes, among other things, a busbar including a first slot and a first bent portion, a first battery cell including a first tab terminal that extends through the first slot, and a weld that secures the first tab terminal to the first bent portion.

In a further non-limiting embodiment of the foregoing traction battery pack, the first tab terminal is received within the first slot such that at least a portion of the first tab terminal is positioned on an opposite side of the busbar from a housing of the first battery cell.

In a further non-limiting embodiment of either of the foregoing traction battery packs, the first slot is flanked by a first crimped portion and a second crimped portion of the busbar.

In a further non-limiting embodiment of any of the foregoing traction battery packs, each of the first crimped portion and the second crimped portion includes an inner curved surface that is configured to limit an insertion distance of the first tab terminal into the first slot.

In a further non-limiting embodiment of any of the foregoing traction battery packs, an elastic guide is configured to urge the first tab terminal into the first slot.

In a further non-limiting embodiment of any of the foregoing traction battery packs, the elastic guide is part of a busbar frame that is secured to the busbar. The busbar frame and the busbar establish a bus bar module of the traction battery pack.

In a further non-limiting embodiment of any of the foregoing traction battery packs, the busbar includes a second slot and a second bent portion. A second tab terminal of a second battery cell extends through the second slot and is supported by the second bent portion.

In a further non-limiting embodiment of any of the foregoing traction battery packs, the busbar electrically connects the first battery cell and the second battery cell.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details busbars for electrically connecting battery cells within a traction battery pack. An exemplary busbar may include features for locating and positioning a tab terminal of a battery cell. For example, the busbar may include a slot and a bent portion. The tab terminal may be received within the slot such that at least a portion of the tab terminal is positioned on an opposite side of the busbar from a housing of the battery cell or a cell stack that includes the battery cell. The tab terminal may be secured (e.g., welded) to the bent portion at a section of the busbar that is exposed within the slot. These and other features are discussed in greater detail in the following paragraphs of this detailed description.

Figure 1:
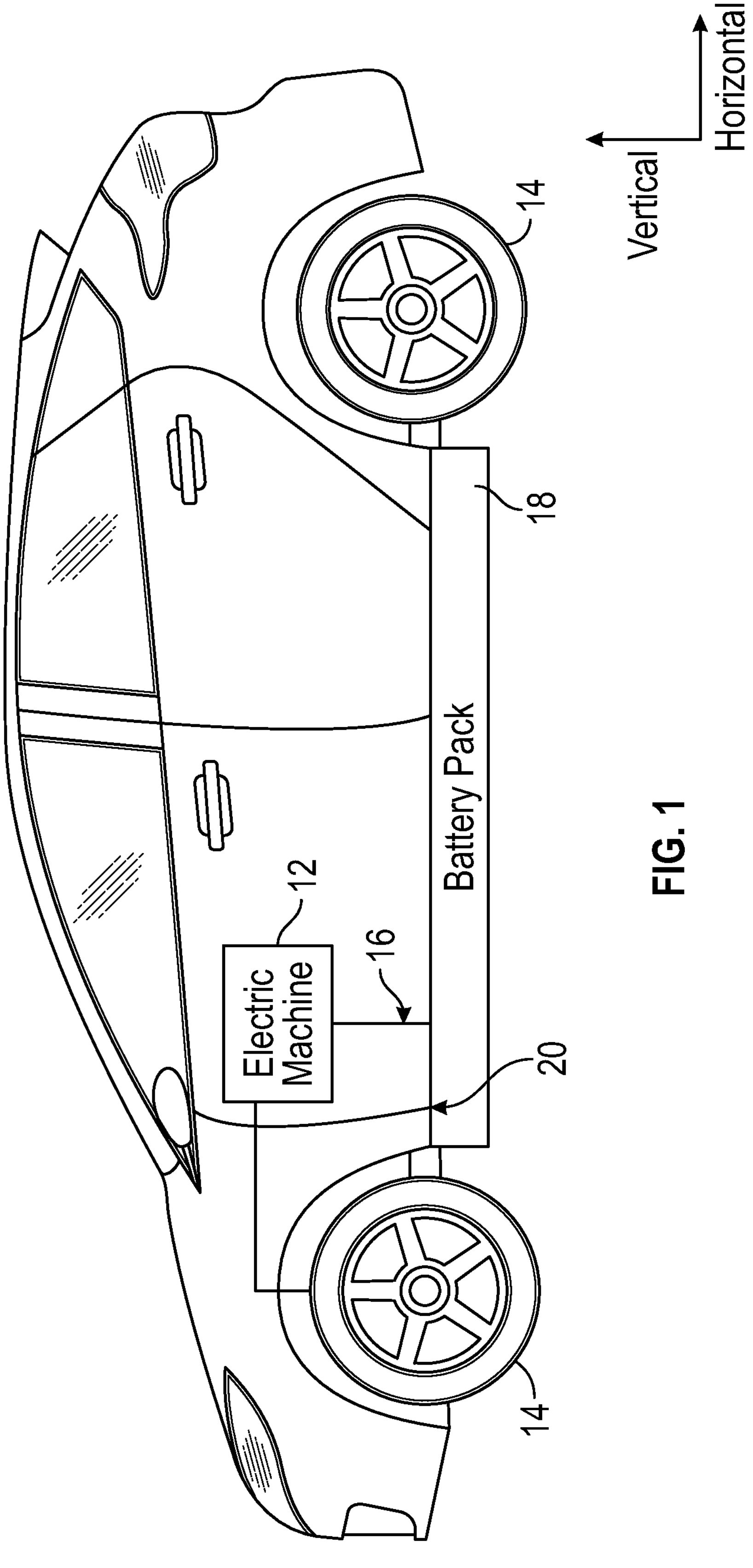
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the powertrain of the electrified vehicle 10 could be equipped with an internal combustion engine that can be employed either alone or in combination with other power sources to propel the electrified vehicle 10.

In the illustrated embodiment, the electrified vehicle 10 is depicted as a car. However, the electrified vehicle 10 could alternatively be a sport utility vehicle (SUV), a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack assembly that includes a plurality of battery cells capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 may be secured to an underbody 20 of the electrified vehicle 10. However, the traction battery pack 18 could be located elsewhere on the electrified vehicle 10 within the scope of this disclosure.

Figure 2:
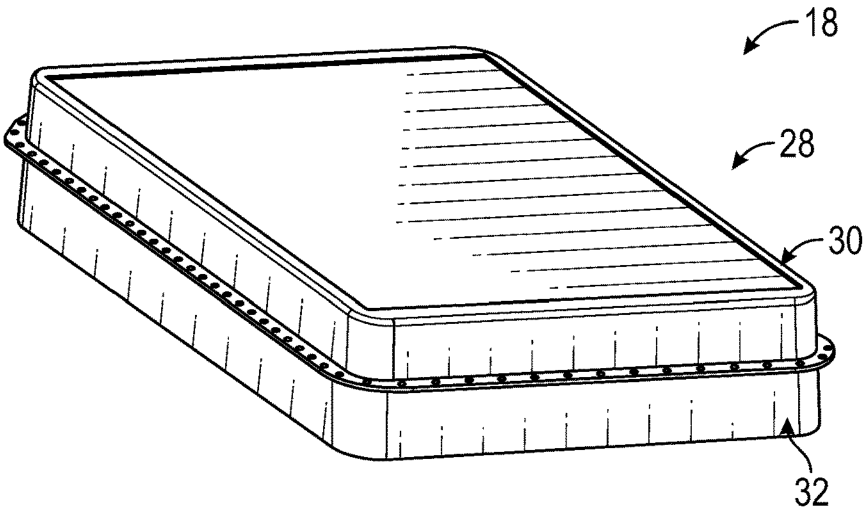
FIG. 2 is a perspective view of a traction battery pack for an electrified vehicle.
Figure 3:
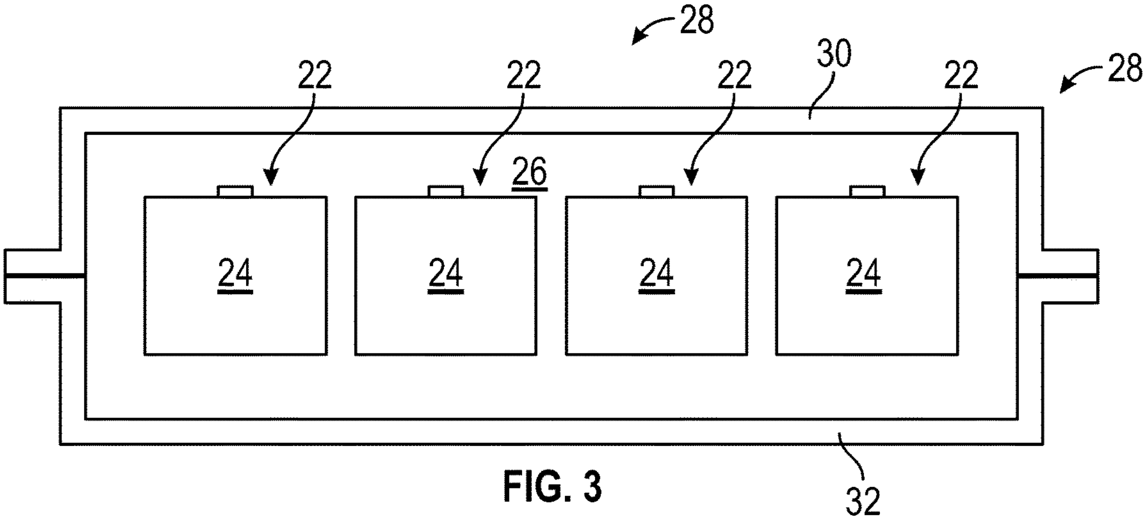
FIG. 3 is a cross-sectional view of the traction battery pack of FIG. 2.

FIGS. 2 and 3 illustrate additional details associated with the traction battery pack 18 of the electrified vehicle 10. The traction battery pack 18 may include one or more battery arrays 22 (e.g., battery assemblies or groupings of rechargeable battery cells 24) capable of outputting electrical power to power the electric machine 12 and/or other electrical loads of the electrified vehicle 10. Other types of energy storage devices and/or output devices could alternatively or additionally be used to electrically power the electrified vehicle 10.

The battery cells 24 may be stacked side-by-side along a stack axis to construct a grouping of battery cells 24, sometimes referred to as a "cell stack." In the highly schematic depiction of FIG. 3, the battery cells 24 are stacked in a direction into the page to construct each battery array 22, and thus the battery arrays 22 may extend in cross-car direction. However, other configurations may also be possible. The total number of battery arrays 22 and battery cells 24 provided within the traction battery pack 18 is not intended to limit this disclosure.

In an embodiment, the battery cells 24 of each battery array 22 are pouch style, lithium-ion cells. However, battery cells having other geometries (cylindrical, prismatic, etc.), other chemistries (nickel-metal hydride, lead-acid, etc.), or both could alternatively be utilized within the scope of this disclosure.

The battery arrays 22 and various other battery internal components (e.g., bussed electrical center, battery electric control module, wiring, connectors, etc.) may be housed within an interior area 26 of an enclosure assembly 28. The enclosure assembly 28 may include an enclosure cover 30 and an enclosure tray 32. The enclosure cover 30 may be secured (e.g., bolted, welded, adhered, etc.) to the enclosure tray 32 to provide the interior area 26. The size, shape, and overall configuration of the enclosure assembly 28 is not intended to limit this disclosure.

Figure 4:
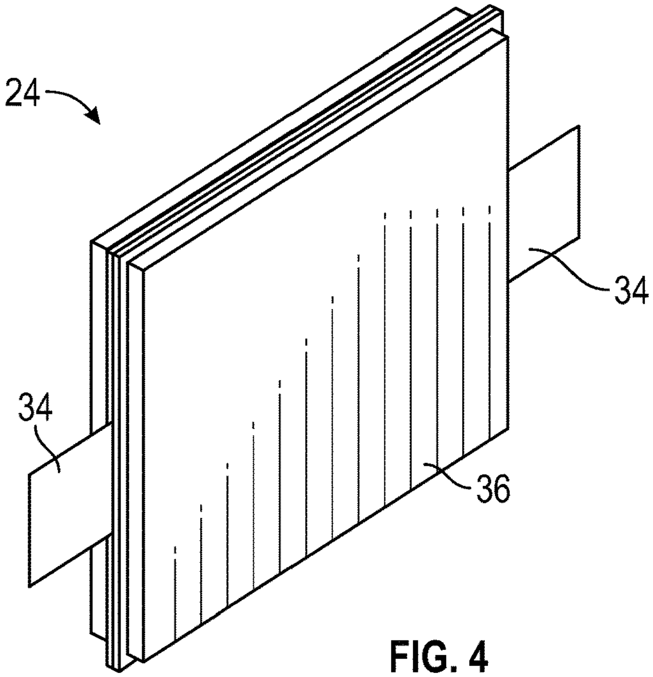
FIG. 4 illustrates a battery cell of a battery array of a traction battery pack.

FIG. 4 illustrates one of the battery cells 24 that can be provided within the traction battery pack 18. Each battery cell 24 may include a housing 36 and a pair of tab terminals 34 that project outwardly from the housing 36. In an embodiment, each battery cell 24 includes two tab terminals 34, with one tab terminal 34 protruding outwardly at each opposing side of the housing 36. In some implementations, an aluminum fin may provide each housing 36. In other implementations, the housing 36 is a multi-layered structure including an aluminum film layer and a polymer layer. However, other housing configurations are also contemplated within the scope of this disclosure.

The tab terminals 34 of the battery cells 24 of each battery array 22 must be reliably connected to one another in order to provide the voltage and power levels necessary for achieving vehicle propulsion. Busbars are sometimes used for making such a connection, however, it can be difficult to properly position and align the tab terminals 34 relative to the busbar during assembly and welding processes. This disclosure is therefore specifically directed to busbars that include features for facilitating proper positioning and alignment of the tab terminals 34 when joining the tab terminals 34 to a busbar.

Figure 5:
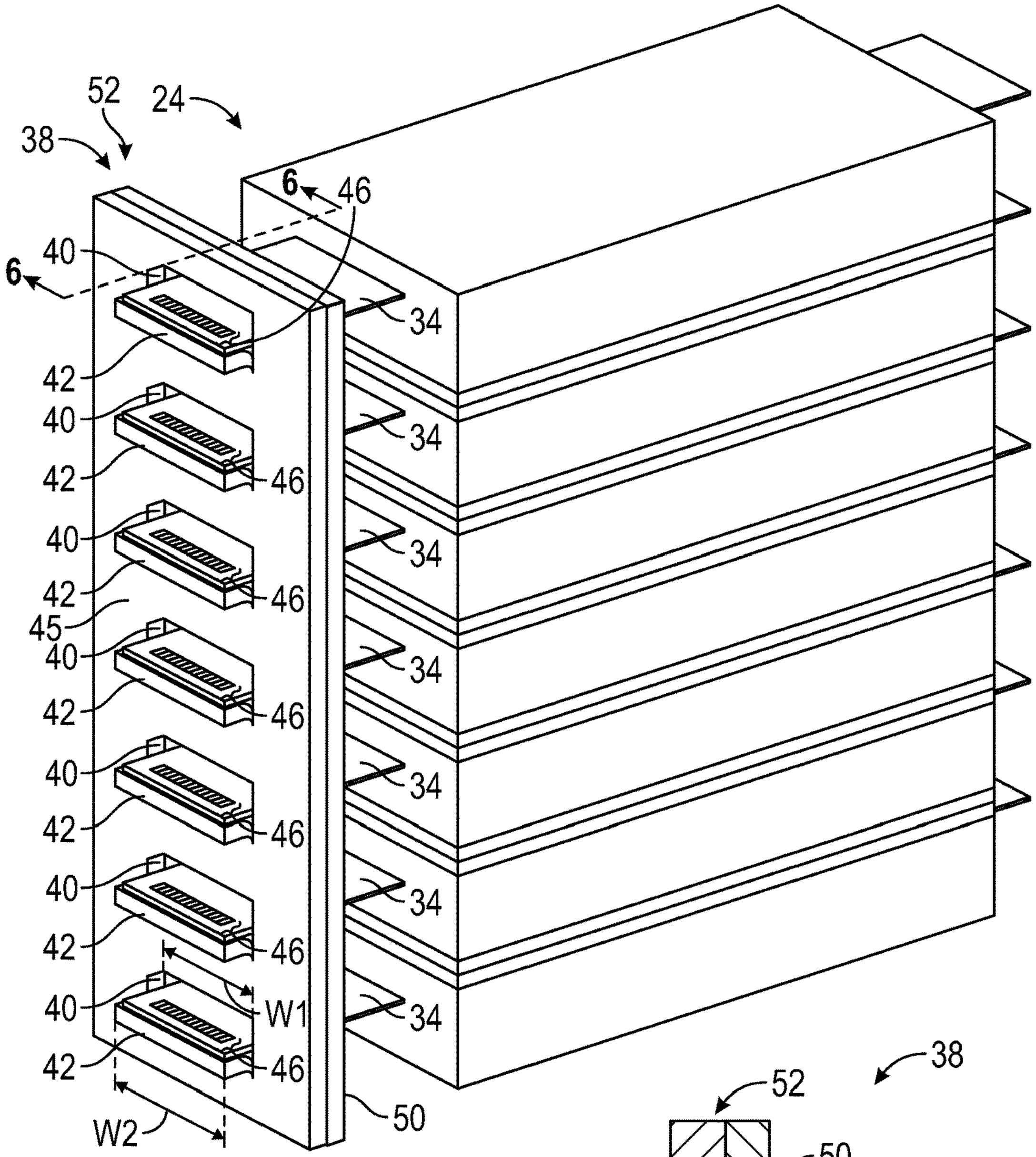
FIG. 5 illustrates a busbar for joining tab terminals of a grouping of battery cells.
Figure 6:
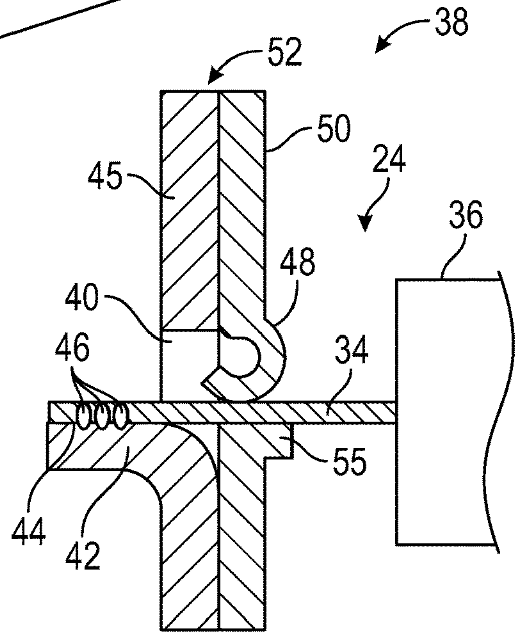
FIG. 6 is a cross-sectional view through section 6-6 of FIG. 5.

FIGS. 5 and 6 illustrate a busbar 38 according to an exemplary embodiment of this disclosure. The busbar 38 may be joined to tab terminals 34 of a grouping of battery cells 24 for electrically connecting the battery cells 24. The grouping of battery cells 24 may be part of one of the battery arrays 22 of the traction battery pack 18, for example. Once electrically coupled, the battery cells 24 may supply electrical power for powering various components of the electrified vehicle 10. In the illustrated embodiment, the busbar 38 is configured to join the tab terminals 34 of seven adjacent battery cells 24. However, the busbar 38 could be configured to join a greater or fewer number of tab terminals 34/battery cells 24 within the scope of this disclosure.

The busbar 38 may include a plurality of slots 40. Each slot 40 may be formed through a body 45 of the busbar 38 and may be sized for receiving one of the cell tab terminals 34. In an embodiment, each slot 40 includes a first width W1 that is larger than a second width W2 of the cell tab terminal 34 received therethrough. The cell tab terminals 34 may extend through the slots 40 such that at least a portion of each cell tab terminal 34 is located on an opposite side of the busbar 38 from the housing 36 of its respective battery cell 24.

Figure 7:
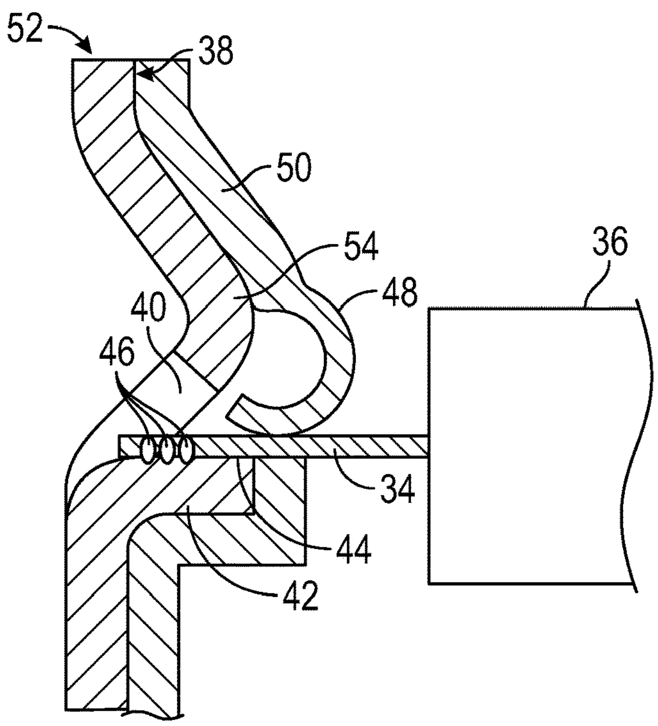
FIG. 7 is a cross-sectional view of another exemplary busbar.

The busbar 38 may additionally include a plurality of bent portions 42. One bent portion 42 may be provided at each slot 40 of the busbar 38, and the bent portion 42 may establish a base of the slot 140, for example. In an embodiment, the bent portions 42 may be bent in a direction away from the battery cells 24 (see FIGS. 5 and 6). In another embodiment, the bent portions 42 may be bent in a direction toward the battery cells 24 (see FIG. 7).

Each slot 40 may be formed in a punch or cutting process, and each bent portion 42 may be formed in a separate bending process. Alternatively, each slot 40 and bent portion 42 pair may be formed in a single step as part of a lancing and bending process.

The tab terminals 34 may be received against and supported by an upper surface 44 of the bent portions 42. Each upper surface 44 may provide a relatively flat surface for locating the tab terminal 34 relative to the respective slot 40 and bent portion 42.

The tab terminals 34 may be joined to the upper surface 44 of the bent portion 42 by one or more welds 46. The welds 46 may be linear or non-linear welds. Prior to formation of the welds 46, the tab terminals 34 may be clamped and/or spot welded to the bent portions 42 to aid in the joining process.

An elastic guide 48 may help locate and position the tab terminals 34 relative to each respective slot 40 and bent portion 42 during assembly. The elastic guide 48 may be configured as a flexible tab or clip-like feature for urging the tab terminals 34 into the slots 40 and against the upper surfaces 44 of the bent portions 42. The elastic guide 48 may include a curved body.

Figure 8:
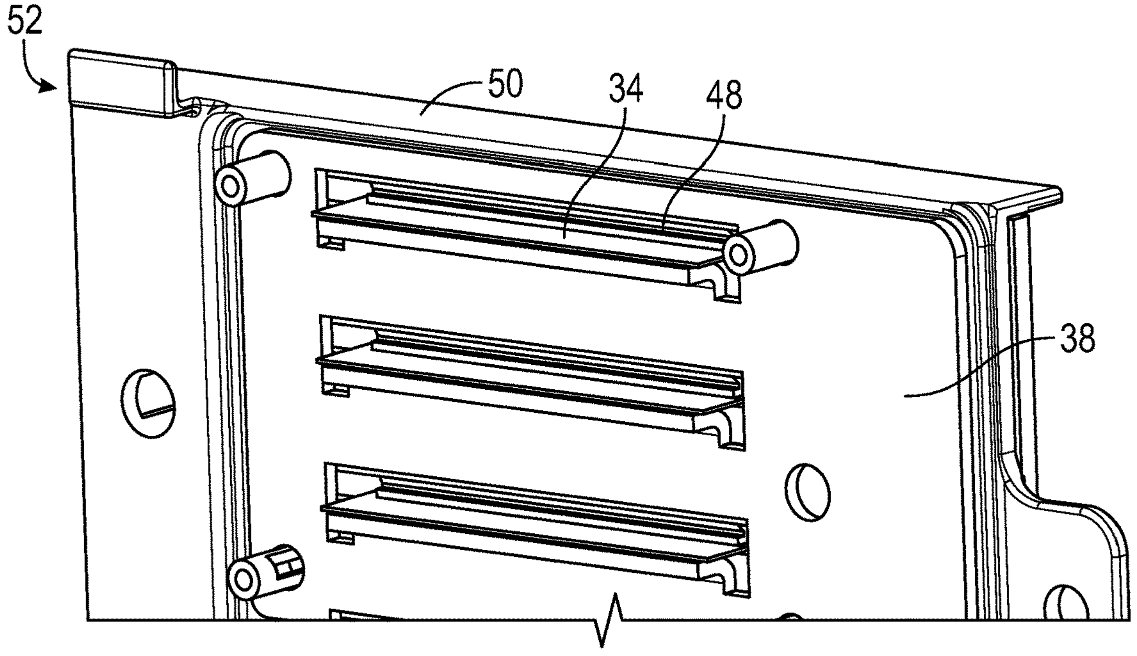
FIG. 8 illustrates a bus bar module that includes a busbar and a busbar frame.

The elastic guides 48 may be part of a busbar frame 50 that can be attached to the busbar 38 (see FIG. 8). Together, the busbar 38 and the busbar frame 50 establish a bus bar module 52.

The busbar frame 50 may additionally include a support surface 55 positioned on an opposite side of the cell tab terminal 34 from the elastic guides 48. The support surfaces 55 may support the cell tab terminals 34.

Figure 11A:
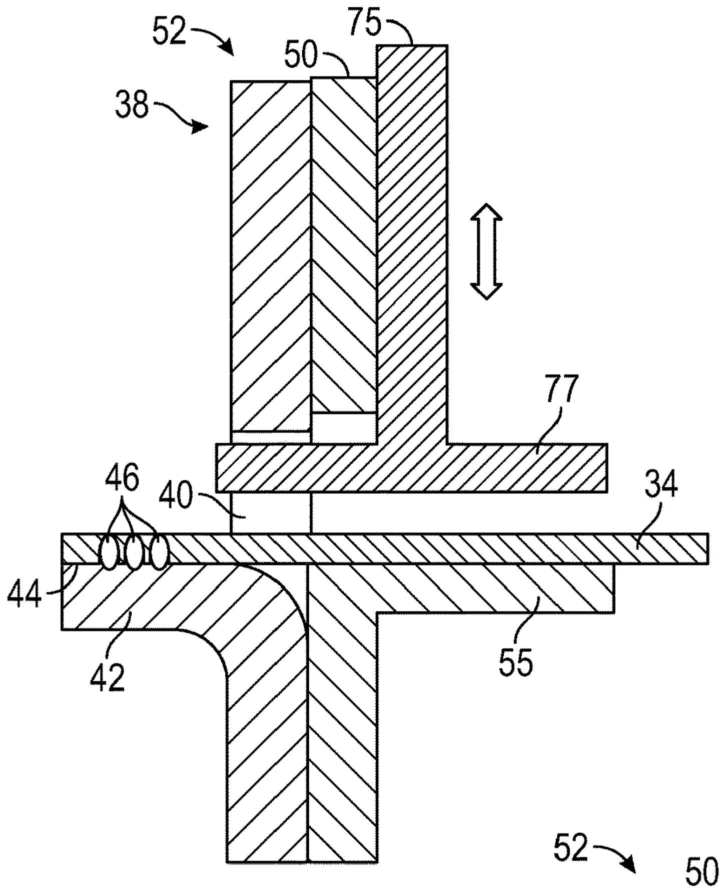
FIGS. 11A and 11B illustrate a clamping feature of a busbar frame.
Figure 11B:
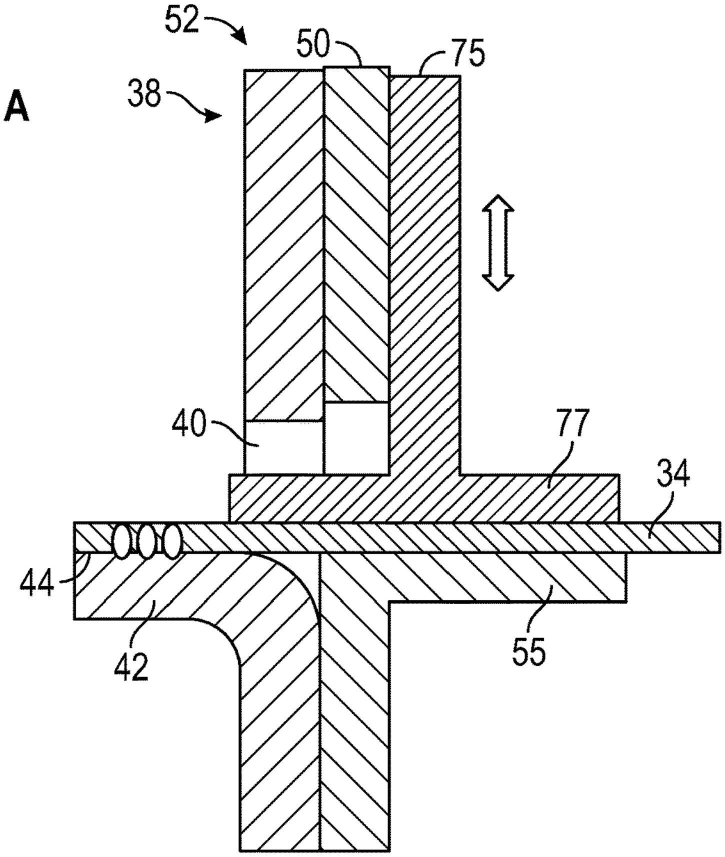

In another embodiment, a slide 75 (see FIGS. 11A and 11B) may be joined to the busbar frame 50. The slide 75 may be moved between a first position (see FIG. 11A) and a second position (see FIG. 11B) to secure the cell tab terminal 34 to the busbar 38 via a clamping force. The cell tab terminal 34 may be clamped between the support surface 55 and a clamp surface 77 of the slide 75 when the slide 75 is moved to the second position.

The busbar 38 may be a metallic component of the bus bar module 52, and the busbar frame 50 may be a plastic component of the bus bar module 52. In an embodiment, the busbar 38 is made of copper or aluminum, and the busbar frame 50 is made of polypropylene or polyethylene. However, other materials are contemplated within the scope of this disclosure.

In some implementations, portions of the body 45 of the busbar 38 that surround each slot 40 (not including the bent portions 42) may provide relatively straight/flat surfaces (see, e.g., FIGS. 5 and 6). In other implementations, some portions of the body 45 of the busbar 38 that surround each slot 40 may include an additional curved portion 54 (see FIG. 7). The curved portion 54 may be optimized to facilitate laser beam access at weld locations.

The embodiments described above and shown in FIGS. 5-8 provide an "lap joint" design between the busbar 38 and the tab terminals 34. However, other configurations are contemplated within the scope of this disclosure.

Figure 9:
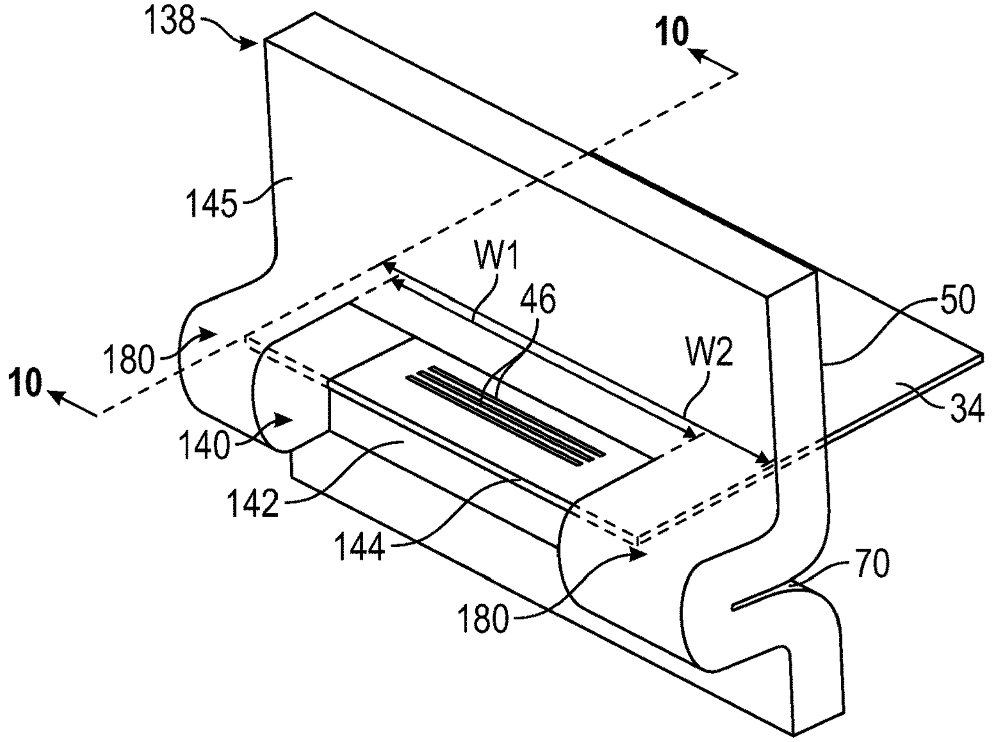
FIG. 9 illustrates another exemplary busbar for joining tab terminals of a grouping of battery cells.
Figure 10:
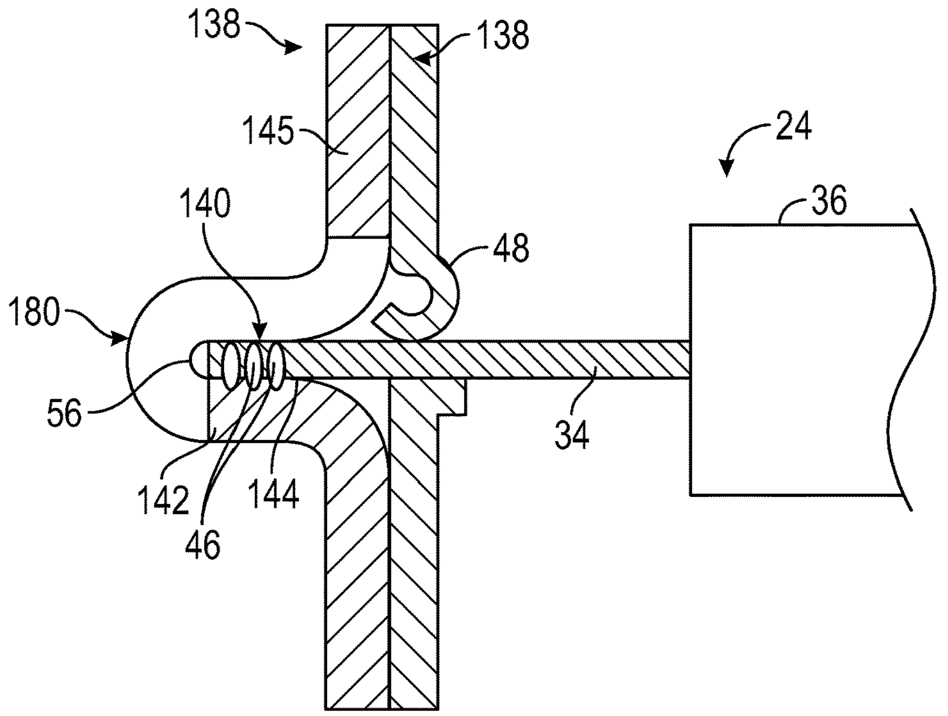
FIG. 10 is a cross-sectional view through section 10-10 of FIG. 9.

FIGS. 9 and 10 illustrate an exemplary busbar 138 that provides another "lap joint" design. The busbar 138 may include a slot 140 formed through a body 145 of the busbar 138. The slot 140 may be sized for receiving one of the cell tab terminals 34. In an embodiment, the slot 140 includes a first width W1 that is smaller than a second width W2 of the cell tab terminal 34. A portion of the tab terminal 34 may be positioned on an opposite side of the busbar 138 from a housing 36 of the battery cell 24 that provides the tab terminal 34, and the portion of the tab terminal 34 that is on the opposite side of the busbar 138 from the housing 36 may be exposed via the slot 140.

The busbar 138 may additionally include a bent portion 142. The bent portion 142 may establish a base of the slot 140, for example. In an embodiment, the bent portion 142 is bent in a direction away from the battery cell 24. However, other configurations are contemplated within the scope of this disclosure.

The slot 140 may be formed in a punch or cutting process, and the bent portion 142 may be formed in a separate bending process. Alternatively, the slot 140 and the bent portion 142 pair could be formed in a single step as part of a lancing and bending process.

The tab terminal 34 may be received against an upper surface 144 of the bent portion 142. The upper surface 144 may provide a relatively flat surface for locating and supporting the tab terminal 34 relative to the slot 140 and bent portion 142.

The tab terminal 34 may be joined to the upper surface 144 of the bent portion 142 by one or more welds 46. The welds 46 may be applied at the portion of the tab terminal 34 that exposed within the slot 140 The welds 46 may be linear or non-linear welds. Prior to formation of the welds 46, the tab terminal 34 may be clamped and/or spot welded to the bent portion 142 to aid in the joining process.

The slot 140 and the bent portion 142 may be flanked by a pair of crimped portions 180 formed in the body 145 of the busbar 138. In an embodiment, the crimped portions 180 extend in a direction away from the battery cell 24 from which the tab terminal 34 protrudes. Outboard sections of the tab terminal 34 may be received within an elongated groove 70 established by the crimped portions 180. The elongated groove 70 opens toward the battery cell 24.

The crimped portions 180 may establish a hemming-like feature for limiting the distance the tab terminal 34 can be inserted through the slot 140. For example, an inner curved surface 56 of each crimped portion 180 may act as a stop for limiting the insertion distance of the tab terminal 34. In this way, the crimped portions 180 may help to locate and position the tab terminal 34 relative to the slot 140 of the busbar 138.

In addition to limiting the tab terminal 34 insertion, the crimped portions 180 can reduce the height of the slot 140 (e.g., compared to when there is no such crimped portions). The crimped portions 180 can therefore effectively limit weld spatter in a direction toward the battery cells 24 during welding processes.

An elastic guide 48 may help locate and position the tab terminal 34 relative to the slot 140 and the bent portion 142 during assembly. The elastic guide 48 may be configured as a flexible clip-like feature for urging the tab terminal 34 into the slot 140 and against the upper surface 144 of the bent portion 142.

In some implementations, portions of the body 145 of the busbar 138 that surround the slot 140 (not including the bent portion 142) may provide relatively straight/flat surfaces (see, e.g., FIGS. 9 and 10). In other implementations, some portions of the body 145 of the busbar 138 that surround each slot 140 may include an additional curved portions.

The exemplary busbars of this disclosure are designed to conveniently locate and position one or more battery cell tab terminals relative to a slot feature of the busbar. The busbars provide for a more consistent and accurate tab terminal alignment and welding, reduce welding errors, and allow for simple and convenient weld repairs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:

a busbar including a slot and a bent portion;

a busbar frame secured to the busbar;

a battery cell including a housing and a tab terminal extending from the housing;

wherein the tab terminal is received within the slot such that at least a portion of the tab terminal is positioned on an opposite side of the busbar from the housing and is positioned against an upper surface of the bent portion; and the busbar frame includes an elastic guide comprising a flexible clip-like feature having a curved body configured to resiliently urge the tab terminal into the slot and bias the tab terminal against the upper surface of the bent portion.

2. The traction battery pack as recited in claim 1, wherein the bent portion establishes a base of the slot.

3. The traction battery pack as recited in claim 1, wherein the bent portion extends in a direction away from the housing of the battery cell.

4. The traction battery pack as recited in claim 1, wherein the bent portion extends in a direction toward the housing of the battery cell.

5. The traction battery pack as recited in claim 1, comprising a weld that secures the tab terminal to the bent portion.

6. The traction battery pack as recited in claim 1, wherein the slot is flanked by a first crimped portion and a second crimped portion of the busbar.

7. The traction battery pack as recited in claim 6, wherein each of the first crimped portion and the second crimped portion includes an inner curved surface that is configured to limit an insertion distance of the tab terminal into the slot.

8. The traction battery pack as recited in claim 6, wherein the tab terminal is received within a groove of each of the first crimped portion and the second crimped portion.

9. The traction battery pack as recited in claim 1, wherein the busbar frame and the busbar establish a bus bar module of the traction battery pack, and the elastic guide is integral to a body of the busbar frame.

10. A traction battery pack, comprising:

a busbar module including a busbar and a busbar frame secured to the busbar;

the busbar including a first slot and a first bent portion;

a first battery cell including a first tab terminal that extends through the first slot;

the busbar frame including an elastic guide that contacts an upper surface of the first tab terminal to urge the first tab terminal into the first slot and a support surface that contacts a lower surface of the first tab terminal to support the first tab terminal as it is urged into the first slot via the elastic guide; and a weld that secures the first tab terminal to the first bent portion.

* * * * *